Oct. 11, 1960  S. O. COOK ET AL  2,955,318
METHOD AND APPARATUS FOR COLLAPSING THERMOPLASTIC TUBING
Filed May 16, 1958
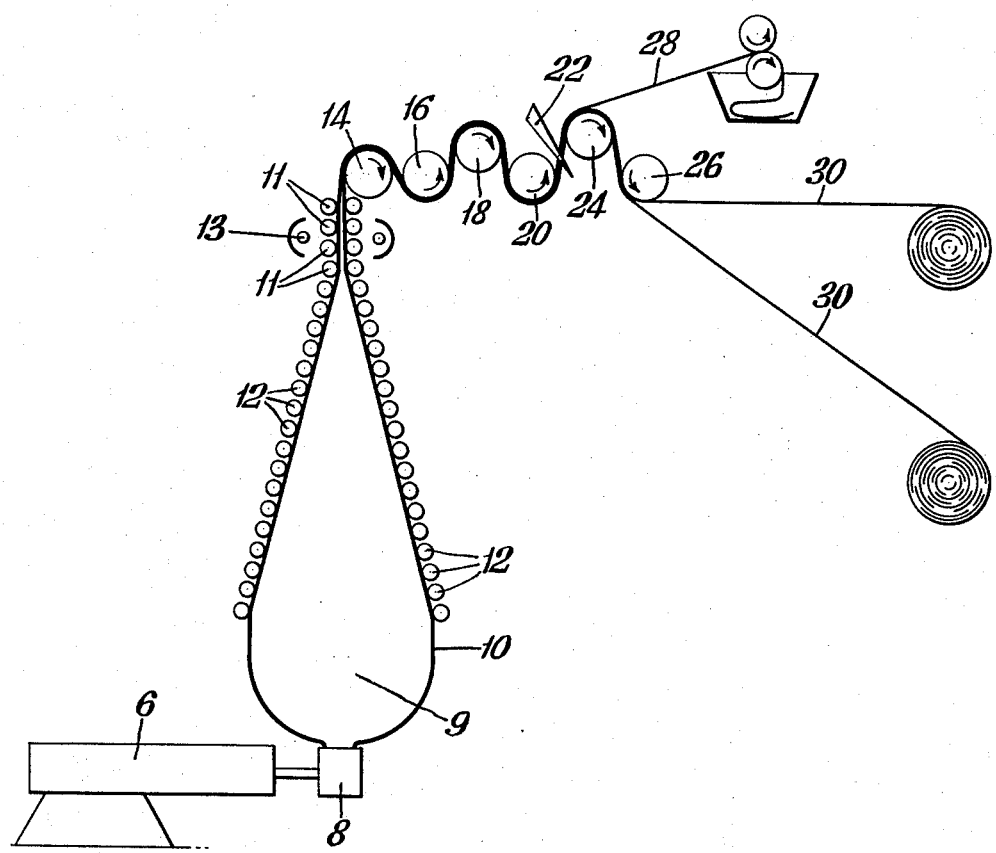
INVENTORS
WALTER A. MILLER
STEPHEN O. COOK
BY
James C. Arvantes
ATTORNEY

United States Patent Office 2,955,318
Patented Oct. 11, 1960

2,955,318

METHOD AND APPARATUS FOR COLLAPSING THERMOPLASTIC TUBING

Stephen O. Cook, Somerville, and Walter A. Miller, North Caldwell, N.J., assignors to Union Carbide Corporation, a corporation of New York Filed May 16, 1958, Ser. No. 735,748

13 Claims. (Cl. 18—1)

This invention relates to a method and apparatus for collapsing thermoplastic tubing. More particularly this invention relates to a method and apparatus for collapsing molecularly oriented, thermoplastic tubing.

Direct collapsing to a wrinkle and crease free "lay flat" film of thermoplastic tubing (having a tensile modulus in excess of about 100,000 p.s.i. at room temperature), which has been stretched to a diameter greater than its extruded diameter at a temperature range within which the stretching operation effects an orientation of the molecules of the thermoplastic material, has not been successfully accomplished up to the present time. With methods and apparatus currently available direct collapsing of molecularly oriented, thermoplastic tubing has resulted in the production of flat film material characterized by creases and wrinkles.

Creasing and wrinkling occasioned on collapsing thermoplastic tubing is caused by stress concentrations which are developed in the thermoplastic material due to the difference in distances that various elements around the circumference of the tubing travel as the tubing is collapsed to form a "lay-flat" film. The thermoplastic material, in order to relieve these high stress concentrations becomes wrinkled and creased. This problem of wrinkling and creasing has up to the present time seriously limited the extent to which the otherwise attractive tubular expansion method has been used to produce molecularly oriented, thermoplastic film as wrinkled or creased film is of little or no value.

It is an object of this invention, therefore, to provide a method and apparatus for collapsing molecularly oriented, thermoplastic tubing wherein the disadvantages of prior methods and apparatus have been eliminated.

It is a further object of this invention to provide a method and apparatus for collapsing molecularly oriented, thermoplastic tubing to produce a "lay-flat" film which is free from all creases and wrinkles.

Accordingly our method and apparatus provide for collapsing a molecularly oriented, thermoplastic tubing having a percent orientation of at least about 400 and a tensile modulus in excess of about 100,000 p.s.i. and which has been expanded and set to a predetermined final diameter, by partially collapsing the expanded tubing whereby the walls of the tubing are brought into substantially parallel and spaced relationship, heating the partially collapsed tubing at a temperature from about 5° C. to about 15° C. above the second order phase transition temperature of the polymer for a period of time ranging from about 5 to 120 seconds while maintaining the substantially parallel and spaced relationship of the walls of the tubing, and thereafter stretching the tubing whereby the tubing is completely collapsed while maintaining the tubing at a temperature of about 5° C. to about 15° C. above the second order phase transition temperature.

The collapsing of molecularly oriented, thermoplastic tubing by the method and apparatus of this invention is characterized by several advantageous features as compared to collapsing of thermoplastic material by hitherto known methods and apparatus. Thus, due to the controlled collapsing of the tubular material, the tubular material when slit produces a flat film free of all creases and wrinkles and characterized by improved physical properties.

The second order phase transition temperatures of thermoplastic material can be conveniently determined by a method described in an article by Fred E. Wiley, "Transition Temperatures and Cubical Expansion," appearing in Industrial and Engineering Chemistry, volume 34, September 1942, on page 1052.

The degree of orientation of molecularly oriented thermoplastic material can be conveniently determined by cutting out small squares of oriented material, generally of a size convenient to handle, i.e., about 3 inches on a side and heating the squares for 10 minutes at 135° C. The squares will shrink and the percent orientation is calculated from the shrinkage according to the formula:

$$\text{percent orientation} = \frac{100 \times \text{area before shrinkage minus area after shrinkage}}{\text{area after shrinkage}}$$

The accompanying drawing shows an apparatus which can be conveniently used to carry out the process of this invention.

In the process phase of this invention a thermoplastic tubular film having a tensile modulus in excess of about 100,000 p.s.i. and having an area percent orientation of at least 400 is partially collapsed at room temperature into the form of a flat ellipse whereby the walls of the tubing are brought into a substantially parallel and spaced relationship. The tubular material, generally collapsed to a height of ¼ to ½ inch and with its wall substantially parallel and spaced, is maintained in this state while heated at a temperature from about 5° C. to about 15° C. above the second order phase transition temperature of the thermoplastic polymer for a period of time ranging from about 5 to about 120 seconds. The actual heating time and temperature will depend on the type of thermoplastic material which is being processed. Usually the heating is carried out by passing the tubing thru a heating zone, at a rate adjusted to subject the thermoplastic material to the aforementioned heating time at the critical temperature range. After the tubing is heated for about 5 to about 120 seconds at a temperature from about 5 to 15° C. above the second order phase transition temperature of the polymer then it is subjected to a stretching operation while maintained at a temperature of about 5 to about 15° C. above the second order phase transition temperature. Generally the stretching operation is conducted by running the partially collapsed tubing over at least 2 rotating, heated surfaces, the second surface rotating at a peripheral speed of about 1 to 5% greater than the first rotating surface. The tubing is entirely collapsed by this stretching operation. The flat film obtained by slitting the tubing and chilling the film to room temperature is entirely crease and wrinkle free.

Reference is now made to the accompanying drawing which previously stated is a schematic showing of one embodiment of an apparatus which can be conveniently used in the practice of this invention.

A thermoplastic polymer having a tensile modulus in excess of about 100,000 p.s.i. is extruded in the form of a seamless tubing 10 from extrusion die head 8 of a conventional extruder 6. The tubing 10 is expanded at a temperature range within which the molecules of the thermoplastic material are oriented in the direction or directions in which a stress is applied. The expansion is accomplished by introducing and maintaining a gaseous medium 9 under pressure within the interior of the tubing 10. The gaseous medium 9 rides as an entrapped bubble between the diehead 8 and roller 14. The tubing 10 is withdrawn from the extrusion diehead at a faster rate than the rate of extrusion by means of rotating roller 14. Once the tubing 10 is expanded and set to its final predetermined diameter it is gradually collapsed at room temperature by a collapsing frame which is generally a set of converging rollers 12 whereby the walls of the tubing are brought into a substantially parallel and spaced relationship. The number and arrangement of the collapsing rolls 12 are such that the tubing is collapsed gradually to minimize as much as possible any major development of stress concentrations in the tubular material. It is generally preferred to provide for a collapsing frame length to the point where walls of the tubing are brought into a substantially parallel and spaced relationship of about 2 to about 5 times the maximum diameter of the expanded tubing. At this point the included angle of the converging rollers 12 which will actually be determined by the type of thermoplastic material which is being partially collapsed is generally about 10° to 40°. The tubular film 10 is collapsed to a spacing of about ¼ to about ½ inch between the walls of the tubing.

Once the walls of the partially collapsed tubing have been brought into a substantially parallel and spaced relationship, the partially collapsed tubing is heated at a temperature from about 5° C. to about 15° C. above the second order phase transition temperature of the polymer for a period of time ranging from about 5 to 120 seconds while maintaining the aforementioned substantially parallel and spaced relationship. The parallel and spaced relationship of the walls of the tubing is maintained by the pressure of the gaseous medium within the interior of the tubing as the tubing passes through a parallel section of the collapsing frame defined by parallel rollers 11.

The length of the parallel section of the collapsing frame defined by rollers 11 again depends on the polymer being processed but is generally from about 10 to 20 percent of the total length of the collapsing frame based on the length of the horizontal rollers and the converging rollers. The heat may be supplied to the partially collapsed tubing by internal heating of the parallel rollers 11 or by positioning heating lamps 13 adjacent to the walls of the tubing.

As previously stated, the tubular film is withdrawn from the extrusion die at a rate greater than the rate of extrusion by means of heated roller 14. The actual peripheral speed of heated roller 14 is such that the partially collapsed tubing is subjected to the action of the heating zone for about 5 to 120 seconds. In addition, the peripheral speed of roller 14 is such that there is no sagging of the partially collapsed tubing.

Roller 14 is maintained at a temperature of about 5 to about 15° C. above the second order phase transition temperature of the thermoplastic material as are also rollers 16, 18 and 20. Roller 16 is driven at a peripheral speed of about 1 to 5% greater than the peripheral speed of roller 14. The partially collapsed tubing is therefore pulled taut on roller 14 due to the tension exerted by the overdrive of roller 16, and the walls of the tubing, as it is laid onto roller 14, are brought into direct contact.

The collapsed tubing is then passed in an S shaped path around heated rollers 16, 18 and 20, each of which is maintained at a peripheral speed of about 1 to 5 percent greater than each preceding roller. The rollers are also arranged so that there is no contact between them. Generally the space between rollers is twice the thickness of the collapsed tubing. The actual size, number, speed and temperature (within the limit of about 5° to about 15° C. above the second order phase transition temperature) of these rollers depends upon the polymer being processed. Actually only two rollers are necessary, heated roller 14 and heated roller 16 driven at a peripheral speed at about 1 to 5 percent greater than roller 14 whereby the collapsed tubing is pulled taut and collapsed as it is pulled over roller 14. Alternatively rollers 16 and 18 can be guide rollers and rollers 14 and 20 the driven rollers.

Once the collapsed tubing leaves roller 20 it is slit along the edges to obtain 2 flat films 30 which are then passed over chilled rollers (at 20° C.) 24 and 26 driven at equal speeds but at a peripheral speed greater by 1 to 5 percent than roller 20. The chilling operation sets the thermoplastic material and the film is then collected and processed in a conventional manner as is well known to those skilled in the art. Trim edge strips 28 are collected in a pan as shown in the drawing.

Illustrative of thermoplastic material i.e. having a tensile modulus in excess of about 100,000 p.s.i. which can be molecularly oriented by tubular expansion methods and collapsed according to the present invention are styrene polymers and copolymers, polymers and copolymers of homologues and analogues of styrene such as para-chlorostyrene, alpha-methylstyrene; the alkyl ring substituted styrenes such as para-ethylstyrene; the vinyl naphthalenes and substituted products thereof.

Among the polymerizable monomeric compounds suitable for copolymerization with styrene and styrene homologues and analogues are included acrylic esters, acrylonitrile, vinyl carbazole, dimethyl alkyl maleate, octyl nitrile, vinyl carbazole, dimethyl alkyl maleate, octyl alkyl maleate 2-ethyl hexyl acrylate ester, butyl methacrylate, hexyl methacrylate, and octyl methacrylate.

The following examples further illustrate our invention and are not intended to limit the scope thereof in any manner.

*Example 1*

A styrene homopolymer, having a molecular weight of about 70,000 as determined by the well-known Staudinger measurement and a second order phase transition temperature of 82° C., was fed in the form of pea-sized pellets into a National Rubber Machinery extruder having an extruder bore size of 2½ inches. The extruder had four heating zones, maintained at 220° C. The viscous styrene homopolymer was screw fed into an extrusion die and extruded at a temperature of 220° C. in the form of a continuous tubing having an outside diameter of 1½ inches and a wall thickness of 0.0625 inch. The emergent extrudate was fed through a collapsing frame 60" long comprising a series of converging rotatable rollers set at an included angle of 15° and a series of parallel rotatable rollers forming a parallel section (8 inches long). The tubing was fed through the collapsing frame to two rotating steel rollers which withdrew the tubing from the extruder at a rate greater than the rate of extrusion. Each of the two rotating steel rollers was 4 inches in diameter, 30 inches long and maintained at a temperature of 95° C. The first heated roller was driven at a peripheral speed of 25 ft. per minute and the second, spaced about ½ of an inch from the first and so arranged that the collapsed tubing passed in S fashion around the rollers, had a peripheral speed of 26½ ft. per minute. The extrusion rate of the tubing was 30 inches per minute.

After stability of the system was attained the extruder zones and the extrusion die temperatures were gradually lowered to 160° C. and the pressure increased from 4900 p.s.i. to 8,000 p.s.i. The extruder screw was maintained at 16 r.p.m. After the extrudate was stabilized and the extrusion temperature lowered to 160° C., the tubing was expanded by introducing air at room temperature and under pressure into the interior of the tubing located between the first driven steel roller, and the extrusion die head.

Enough air pressure was maintained in the interior of the tubing to expand the original diameter approximately 6 times and to prevent a complete collapse of the tubing until it was pulled taut onto the first driven steel roller. The tubing as it passed thru the converging section of the collapsing frame was gradually collapsed to a flat ellipse. The walls of the flat ellipse were substantially parallel and spaced ⅜ of an inch apart. The partially collapsed tubing was then passed through the parallel section of the collapsing frame which was pre-heated to a temperature of 95° C. From this parallel section the tubing passed over the aforementioned rotating rollers in S fashion and slit along its edges to produce two flat film sections. These flat film sections were then passed in S fashion through 24" by 34" rollers both rollers being maintained at a temperature of about 20° C. and driven at a rate of 28 ft./minute. After leaving the chilling rollers the two flat film sections were separated and wound into separate spools. The edge trim strips were collected for reprocessing.

The biaxially stretched film had a high degree of orientation, high luster, good flexibility, improved physical properties and no wrinkles or creases as indicated by the following tabulated data.

|  | Biaxially Stretched Tubing | Non-stretched Tubing |
| --- | --- | --- |
| Nature | tough-pliable, good luster entirely wrinkle and crease free. | Brittle-poor luster. |
| Outside Diameter_____inches__ | 14 | 1½. |
| Wall Thickness_____do____ | 0.001 | 1/16. |
| Width of Film (Obtained do____ by Slitting Tubing). | 42 | 4.7. |
| Tensile Strength of Film p.s.i.__ (ASTM-D-882-54 T-C) (both directions). | 10,000 | 7,000. |
| Elongation of Film percent__ (ASTM-D-882-54-T-C) both directions. | 15 | 2. |
| Tensile Modulus of Film p.s.i.__ (ASTM-D-882 T-C). | 400,000 |  |
| Percent orientation_____ | 2450 |  |

*Example II*

A styrene-acrylonitrile copolymer such as described in Canadian Patent 457,340 containing about 72 percent by weight styrene and about 28 percent by weight acrylonitrile polymerized therein was extruded, stretched and collapsed, slit and set in a manner described in Example I.

The biaxially stretched film also had a high degree of molecular orientation, high luster, good flexibility, improved physical properties, and no wrinkles or creases as indicated by the following tabulated data.

|  | Biaxially Stretched Tubing | Non-stretched Tubing |
| --- | --- | --- |
| Nature | Tough, pliable, good luster, entirely wrinkle and crease free. | Brittle, poor luster. |
| Outside Diameter_____inches__ | 5 | ⅞. |
| Wall Thickness_____do____ | 0.0015 | 1/32. |
| Width of Film (Obtained do____ by Slitting Tubing). | 18 | 2.75. |
| Tensile Strength of Film p.s.i.__ (ASTM-D-882-54 T-C) (both directions). | 14,000 | 8,500. |
| Elongation of Film percent__ (ASTM-D-882-54 T-C). | 20 | 2. |
| Tensile Modulus of Film p.s.i.__ (ASTM-D-882 T-C). | 440,000 |  |
| Percent Orientation_____ | 2520 | no orientation. |

The styrene homopolymer described in Example I and also the styrene-acrylonitrile copolymer described in Example II were extruded and biaxially stretched to effect a molecular orientation of the molecules of the polymer in a manner described in Example I. The expanded tubings were collapsed by feeding into conventional rotating pinch rolls which are generally used in present day methods and apparatus in order to collapse tubular material. A detailed explanation of collapsing expanded tubing by passing it through rotating pinch rolls is to be found in U.S. Patent 2,461,975 to E. D. Fuller.

Film obtained by slitting the collapsed tubings was characterized by creases and wrinkles in each case and was unacceptable for any practical commercial use.

For a detailed explanation of biaxially stretching thermoplastic tubing to effect a molecular orientation of the molecules thereof reference is made to our copending application Ser. No. 735,738 filed concurrently herewith.

What is claimed is:

1. Method for collapsing an expanded molecularly oriented thermoplastic tubing which has been expanded and set to a predetermined final diameter which comprises collapsing said tubing into the form of a flat ellipse whereby the walls of the tubing are brought into substantially parallel and spaced relationship, heating said tubing at a temperature of from about 5° to about 15° C. above the second order phase transition temperature of said thermoplastic tubing for a period of time ranging from about 5 to about 120 seconds while maintaining the parallel and spaced relationship of the walls, and thereafter collapsing said tubing while maintaining the said tubing at a temperature of from about 5° to about 15° C. above the second order phase transition temperature.

2. Method for collapsing an expanded, molecularly oriented thermoplastic tubing which has been expanded and set to a predetermined final diameter which comprises collapsing said tubing into the form of a flat ellipse whereby the walls of the tubing are brought into substantially parallel and spaced relationship, heating said tubing at a temperature of from about 5° to about 15° C. above the second order phase transition temperature of the thermoplastic tubing for a period of time ranging from about 5 to about 120 seconds, passing said heated and partially collapsed tubing over a heated surface and stretching said tubing to collapse the walls of said tubing while it is passing over said heated surface said surface maintained at a temperature sufficient to maintain the tubing at a temperature of from about 5° C. to about 15° C. above its second order phase transition temperature.

3. Method as defined in claim 2 wherein the stretching of the partially collapsed tubing is effected by passing said tubing around two heated surfaces, the second of said heated surfaces rotating at a peripheral speed of about 1 to 5 percent greater than the first said surface.

4. Method as defined in claim 2 wherein the surfaces are maintained at a temperature from about 5° to about 15° C. above the second order phase transition temperature of said thermoplastic tubing.

5. Method for collapsing an expanded, molecularly oriented tubing of a styrene polymer which has been expanded and set to a predetermined final diameter which comprises collapsing said tubing into the form of a flat ellipse whereby the walls of the tubing are brought into substantially parallel and spaced relationship, heating said tubing at a temperature of from about 5° C. to about 15° C. above the second order phase transition temperature of said thermoplastic tubing for a period of time ranging from about 5 to about 120 seconds while maintaining the parallel and spaced relationship of the walls, and thereafter collapsing said tubing while maintaining the said tubing at a temperature of from about 5° C. to about 15° C. above the second order phase transition temperature.

6. Method for collapsing an expanded, molecularly oriented tubing of a styrene homopolymer which has been expanded and set to a predetermined final diameter which comprises collapsing said tubing into the form of a flat ellipse whereby the walls of the tubing are brought into substantially parallel and spaced relationship, heating said tubing at a temperature of from about 5° C. to about 15° C. above the second order phase transition temperature of said thermoplastic tubing for a period of time ranging from about 5 to about 120 seconds while maintaining the parallel and spaced relationship of the walls, and thereafter collapsing said tubing while maintaining the said tubing at a temperature of from about 5° C. to about 15° C. above the second order phase transition temperature.

7. Method for collapsing an expanded, molecularly oriented tubing of a styrene-acrylonitrile copolymer which has been expanded and set to a predetermined final diameter which comprises collapsing said tubing into the form of a flat ellipse whereby the walls of the tubing are brought into substantially parallel and spaced relationship, heating said tubing at a temperature of from about 5° C. to about 15° C. above the second order phase transition temperature of said thermoplastic tubing for a period of time ranging from about 5 to about 120 seconds while maintaining the parallel and spaced relationship of the walls, and thereafter collapsing said tubing while maintaining the said tubing at a temperature of from about 5° C. to about 15° C. above the second order phase transition temperature.

8. Apparatus for collapsing an expanded, molecularly oriented, thermoplastic tubing which has been expanded and set to a predetermined final diameter to a flat, wrinkle- and crease-free condition comprising a converging frame, a parallel frame following said converging frame for receiving said tubing from said converging frame, means for passing said tubing through said converging frame and parallel frame whereby the said tubing is partially collapsed with the walls thereof gradually brought into a substantially parallel and spaced relationship, means for heating said tubing as said tubing is passed through said parallel frame, and means for completely collapsing said tubing once said tubing has passed out of said parallel frame.

9. Apparatus for collapsing an expanded, molecularly oriented, thermoplastic tubing which has been expanded and set to a predetermined final diameter to a flat, wrinkle- and crease-free condition comprising a converging frame forming an included angle of from about 10° to about 40°, a parallel frame following said converging frame for receiving said tubing from said converging frame, means for passing said tubing through said converging frame and parallel frame whereby the tubing is partially collapsed with the walls thereof gradually brought into a substantially parallel and spaced relationship, means for heating said tubing as said tubing is passed through said parallel frame, and means for completely collapsing said tubing once said tubing has passed out of said parallel frame.

10. Apparatus for collapsing an expanded, molecularly oriented, thermoplastic tubing which has been expanded and set to a predetermined final diameter to a flat wrinkle- and crease-free condition comprising a converging frame forming an included angle of from about 10° to about 40°, a parallel frame having a length from about 10 to about 20 percent of the combined length of the converging frame and parallel frame following said converging frame for receiving said tubing from said converging frame, means for passing said tubing through said converging frame and parallel frame whereby the tubing is partially collapsed with the walls thereof gradually brought into a substantially parallel and spaced relationship, means for heating said tubing as said tubing is passed through said parallel frame, and means for completely collapsing said tubing once said tubing has passed out of said parallel frame.

11. Apparatus as defined in claim 10 wherein the length of the converging frame is about 2 to about 5 times the maximum diameter of the expanded tubing.

12. Apparatus for collapsing an expanded, molecularly oriented, thermoplastic tubing which has been expanded and set to a predetermined final diameter to a flat, wrinkle- and crease-free condition comprising a converging frame, a parallel frame following said converging frame for receiving said tubing from said converging frame, a first driven roller adjacent to said parallel frame for receiving and withdrawing said tubing through said converging frame and parallel frame whereby the tubing is partially collapsed with the walls thereof gradually brought into a substantially parallel and spaced relationship, means for heating said tubing as said tubing is passed through said parallel frame, a second driven roller adjacent to the said first driven roller for receiving and withdrawing said tubing therefrom, said second driven roller having a peripheral speed greater than the peripheral speed of the first driven roller whereby the tubing, as it is withdrawn over said first driven roller by said second driven roller, is pulled taut and collapsed thereon.

13. Apparatus for collapsing an expanded, molecularly oriented, thermoplastic tubing which has been expanded and set to a predetermined final diameter to a flat, wrinkle- and crease-free condition comprising means to partially collapse said tubing whereby the walls thereof are brought into a substantially parallel and spaced relationship, means for heating said tubing while maintaining the spaced and parallel relationship of the walls thereof and means to completely collapse said heated tubing.

References Cited in the file of this patent

UNITED STATES PATENTS

| 2,697,852 | Bailey | Dec. 28, 1954 |
| 2,763,029 | Tulloss | Sept. 18, 1956 |
| 2,832,994 | Ahlich et al. | May 6, 1958 |